United States Patent Office 3,215,494
Patented Nov. 2, 1965

3,215,494
METHOD OF TREATING CHRYSOTILE AND PRODUCT PRODUCED THEREBY
Glen A. Hemstock, East Brunswick, N.J., assignor to Minerals & Chemicals Philipp Corporation, Menlo Park, N.J., a corporation of Maryland
No Drawing. Filed Jan. 10, 1962, Ser. No. 165,310
6 Claims. (Cl. 23—110)

The present invention has to do with a novel method of hydrothermally treating asbestos. The invention relates also to a novel synthetic crystalline magnesium silicate obtained by this method.

Chrysotile, a crystalline substance which may be represented by the formula $3MgO.2SiO_2.2H_2O$, is the principal mineral constituent of the commercial form of asbestos. Chrysotile is a fibrous silky mineral and many of its principal uses depend on the flexibility and fire-retardant properties of the fibers.

An object of the invention is the provision of a method for converting chrysotile asbestos into a novel material useful in applications for which the naturally occurring chrysotile is unsuited.

A further object of the invention is the production of a novel hydrated magnesium silicate material from chrysotile.

Another object of my invention is the provision of a method of destroying the original crystal structure of chrysotile and reconstructing this material into a new and different hydrous magnesium silicate.

Further objects and features of my invention will be apparent from the description of my invention which follows.

I have discovered that chrysotile may be converted by a hydrothermal treatment hereafter described into a novel powder which has essentially the same chemical composition as chrysotile but which otherwise bears little resemblance to chrysotile.

Stated briefly, in accordance with the present invention, chrysotile is calcined at an elevated temperature at which substantial dehydration occurs and the crystal structure of the chrysotile is destroyed. The calcined material is then rehydrated by subjecting it to hydrothermal treatment at superatmospheric pressure. As a result of treating chrysotile in this manner, the long flexible silky fibers of the starting material are converted into a fine fluffy powder. Electron micrographs of the product of the present invention show that the powder consists of submicroscopic needles, the edges of which are distinctly serrated. These serrations are not apparent in electron micrographs of raw chrysotile or calcined chrysotile.

The product of my invention is useful as an antiskid or friction agent when it is coated on paper products, such as kraft paper bags. A coating composition may be prepared by slurrying the synthetic silicate in water and incorporating an adhesive such as starch or sodium silicate. The coating composition is applied to paper by brushes, rolls or spraying devices, in amount such that discrete particles of the synthetic silicate crystals are disseminated on the paper surface to the treated. Another promising use of the material is as an adsorbent in the purification of swamp waters.

The novel magnesium silicate product of my invention appears to contain a definite hydrate with a water of crystallization of about 5.3% to about 5.9%. It is not presently known whether the product consists solely of a crystalline phase or whether it is a mixture of a hydrated crystalline material and one or more amorphous materials. It will be noted that the water of crystallization of the product is appreciably less than that of the starting asbestos which is theoretically about 13%. Water of crystallization is calculated as follows:

$$\text{Percent water of crystallization} = \frac{(L.O.I. - F.M.)}{(100 - F.M.)} \times 100$$

"L.O.I." in the equation represents loss on ignition which is determined by heating the chrysotile to constant weight at 1000° C. "F.M." represents free moisture, which is determined by heating the chrysotile to constant weight at 105° C.

More specifically, as the starting material in the production of the novel synthetic hydrated magnesium silicate, I employ a pure grade of chrysotile. Asbestos is commercially available is a variety of fiber grades ranging from No. 1 grade containing very short fibers through No. 7, which contains long stable fibers. Any grade of asbestos may be employed provided it contains substantially pure chrysotile. I prefer to employ asbestos which has been broken up into individual fibers.

In carrying out the process, the raw chrysotile is calcined at a temperature and for a time sufficient to decompose the chrysotile into a material in which forsterite is the only crystal phase present. Standard X-ray powder diffraction procedures will be useful in identifying crystalline phases. When calcination temperature (or time) is inadequate, X-ray powder diffraction patterns of the calcined product will show characteristic chrysotile lines. Any chrysotile present in the calcined product will persist in the hydrothermally treated material and will represent an undesirable contaminant in the end product. If the calcination temperature is too high, the X-ray powder diffraction pattern will show the presence of enstatite. When such a material is hydrothermally treated, the desired product is not obtained. The calcination may be conducted at about 650° C. to 1100° C. and preferably within the range of 700° C. to 900° C. When a calcination temperature as low as 650° C. is employed, a calcination time of at least 24 hours is recommended. Calcination period of about 15 minutes or even less will usually suffice when the calcination temperature is within the range of 700° C. to 1100° C. The calcination periods may be considerably longer than those mentioned above without adverse effect. For example, substantially the same ultimate product will be obtained when the chrysotile is calcined at 800° C. for 10 minutes or 16 hours. Calcination should reduce the water of crystallization of the material to about 1% to 2% or somewhat less. The decomposition of the chrysotile structure is accompanied by the breakdown of the fibers into a powdery material. It is reasonable to expect that this powdery material is not pure forsterite but is a mixture of forsterite with one or more amorphous decomposition products. The calcined material is cooled prior to rehydration by hydrothermal treatment.

The calcined chrysotile is then rehydrated with high pressure steam. A bomb or other suitable pressurized equipment may be used. I prefer to employ saturated steam at a pressure of from about 300 p.s.i.g. up to, but not including, the critical pressure. The calcined chrysotile is maintained under such pressure at least until the water of crystallization of the product is 5.3% to 5.9%. The minimum time to achieve the rehydration will vary inversely with the steam pressure employed and will usually be within the range of about ¼ to 24 hours. It has been found that the calcined chrysotile may be subjected to the action of the saturated steam for a period of time substantially longer than that required to rehydrate the calcined chrysotile at 5.3% to 5.9% water of crystallization without effecting an observable change in the water of crystallization and other properties of the ultimate product.

The calcined chrysotile is insensitive to variation in steam pressure, provided such pressure is maintained sufficiently long to effect the full rehydration. By way of illustration, apparently the same products were obtained when samples of chrysotile calcined at 800° C. for an hour were bombed with saturated steam at 800 p.s.i.g. for 2 hours, 1600 p.s.i.g. for 2 hours and 2400 p.s.i.g. for 30 minutes.

Although I have obtained excellent results using saturated steam, it is reasonable to expect that unsaturated steam may be used with the same results.

In addition to effecting a change in the crystal structure and form of the asbestos, the controlled dehydration and rehydration in accordance with the invention, brings about other remarkable changes in the asbestos. By way of illustration, the B.E.T. surface area of chrysotile is about 15 square meters per gram and the surface area of the calcined chrysotile intermediate is somewhat greater, typically about 20 square meters per gram. The B.E.T. surface area of the product of the present invention is about 130 to 160 square meters per gram, a remarkable increase over the surface area of the asbestos. The methylene blue adsorption value of a typical product of the present invention is about 33 milligrams per gram; the methylene blue adsorption value of calcined chrysotile is only about 3 milligrams per gram. It has been found that the synthetic magnesium silicate of the present invention differs from most alkaline earth silicates in that it has no cation-exchange capacity.

The following example is given to illustrate more fully the synthesis of a product of the present invention from asbestos.

The starting asbestos was No. 3 grade from Quebec and was substantially pure chrysotile. The chrysotile was calcined in a preheated muffle furnace at 800° C. for an hour and then cooled. The water of crystallization of the calcined chrysotile was 1.38% and the B.E.T. surface area was 20.3 square meters per gram. An X-ray powder diffraction pattern of this material showed that forsterite was the sole crystalline phase present.

A 33⅓% solids slip of the calcined chrysotile was prepared by mixing 10 parts by weight of the calcined chrysotile with 20 parts by weight of distilled water. The slip was poured into a one gallon stainless steel autoclave. The slip was maintained under saturated steam at a pressure of 1600 p.s.i.g. for 2 hours. The bombed slip was air dried. The product was a fine fluffy brown powder having the following properties:

| | | |
|---|---|---|
| Water of crystallization | percent | 5.3 |
| Surface area (B.E.T.) | sq.m./g | 156 |
| Pore volume | cc./g | 0.200 |
| Methylene blue adsorption | mg./g | 33 |
| Density | g./cm.$^3$ | 2.83 |
| Tamped bulk density | lbs./ft.$^3$ | 26.02 |
| Average particle size[1] | microns | 20 |

[1] Determined by the Casagrande water sedimentation method.

I claim:

1. A method of treating chrysotile with comprises calcining chrysotile at a temperature within the range of 650° C. to 1100° C. and for a time sufficient to destroy the chrysotile crystal structure and subjecting the calcined chrysotile to hydrothermal treatment under superatmospheric pressure until the water of crystallization of said calcined chrysotile is within the range of from about 5.3% to about 5.9%.

2. A method of treating chrysotile which comprises calcining chrysotile at about 800° C. for a time such that an X-ray diffraction pattern of the calcined product indicates that forsterite is the only crystalline phase present and directly contacting the calcined chrysotile with saturated steam at a pressure within the range of from 300 p.s.i.g. to the critical pressure until the water of crystallization of said calcined chrysotile is within the range of from about 5.3% to about 5.9%.

3. A method of treating chrysotile which comprises calcining chrysotile at a temperature within the range of 650° C. to 1100° C. for a time such that an X-ray diffraction pattern of the calcined product indicates that forsterite is the only crystalline phase present and directly contacting said calcined chrysotile with high pressure steam until the water of crystallization of said calcined chrysotile is within the range of from about 5.3% to about 5.9%.

4. A method of treating chrysotile which comprises calcining chrysotile at a temperature within the range of 650° C. to 1100° C. for a time such that an X-ray diffraction pattern of the calcined product indicates that forsterite is the only crystalline phase present and directly contacting said calcined chrysotile with saturated steam at a pressure within the range of about 300 p.s.i.g. to the critical pressure until the water of crystallization of said calcined chrysotile is within the range of about 5.3% to about 5.9%.

5. A method of treating chrysotile which comprises dehydrating chrysotile at a temperature within the range of 650° C. to 1100° C. and rehydrating said dehydrated chrysotile with high pressure saturated steam until the water of crystallization of the dehydrated material is within the range of 5.3% to 5.9%.

6. A powdered synthetic hydrated magnesium silicate obtained by calcining chrysotile at a temperature within the range of 650° C. to 1100° C. for a time such that an X-ray diffraction pattern of the calcined product indicates that forsterite is the only crystalline phase present and subjecting the calcined chrysotile to hydrothermal treatment under superatmospheric pressure until the water of crystallization of said calcined chrysotile is within the range of about 5.3% to about 5.9%, said powdered synthetic hydrated magnesium silicate having a B.E.T. surface area of at least about 130 square meters per gram and being further characterized by the fact that particles thereof consist of microscopic needles which have serrated edges.

References Cited by the Examiner

UNITED STATES PATENTS

| 2,616,801 | 11/52 | Badollet et al. | 23—110 |
| 2,926,997 | 3/60 | Kalousek | 23—110 |

OTHER REFERENCES

Mellor, "Comprehensive Treatise on Inorganic and Theoretical Chemistry," vol. 6, page 426, Longmans, Green & Co., New York, 1925.

MAURICE A. BRINDISI, *Primary Examiner.*